J. S. ANDERSON.
TRAP.
APPLICATION FILED MAR. 7, 1916.
1,305,333.
Patented June 3, 1919.
Fig. 1.
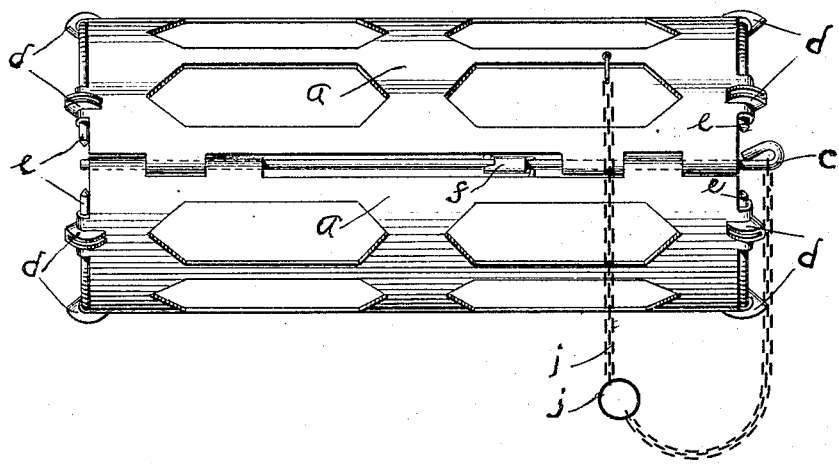
Fig. 2.
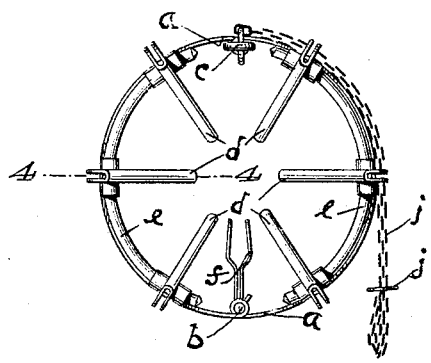
Fig. 3.
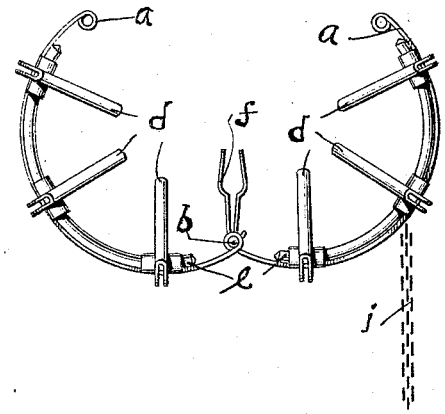
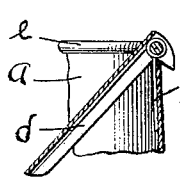
Fig. 4.
Witnesses:
Andrew Drengson
C. S. Olson
Inventor:
John Severin Anderson

UNITED STATES PATENT OFFICE.

JOHN SEVERIN ANDERSON, OF MARBLE TOWNSHIP, LINCOLN COUNTY, MINNESOTA.

TRAP.

1,305,333.   Specification of Letters Patent.   Patented June 3, 1919.

Application filed March 7, 1916. Serial No. 82,606.

*To all whom it may concern:*

Be it known that I, JOHN SEVERIN ANDERSON, a citizen of the United States, residing in the township of Marble, in the county of Lincoln and State of Minnesota, have invented a new and useful Improvement in Traps, of which the following is a specification.

The invention relates to improvement in traps, and the object of the present invention is to generally improve upon and render more efficient the trap upon which I have been granted Letters Patent in the United States, Number 1,000,358, of August 15th, 1911.

The invention relates to an improvement in traps and has for its object: 1. To provide a trap (of a cylindrical type for catching fur bearing animals) which will not choke nor break the legs of the game, as is the case when caught in the most of the common traps. 2. To provide a trap which will catch the game when either going out of or into their dens.

In the accompanying drawing illustrating the preferred embodiment of my invention, Figure 1. is a perspective view thereof; Fig. 2. is an end view when closed, (as it will be when setting) showing the inwardly projected spring points, the arch connecting the same, and the bait holder mounted on the hinge-pin. Fig. 3. is an end view of the same when open to remove the game. Fig. 4. is a detailed side view at, 4—4, of Fig. 2, the inwardly projecting point and its spring.

Similar letters refer to similar parts throughout the several views. The semi-cylindrical parts "*a*", the hinge-pin "*b*", and the lock-pin "*c*", constitute the main frame of the trap.

At the ends and inside of the semi-cylindrical parts "*a*", are pivotally mounted spring supported inwardly projecting barbs or points "*d*", said points "*d*", are connected to the semi-cylindrical parts "*a*", by an arch or semi-circular part "*e*", which is inserted through the eyes or holes of the points "*d*", and through the eyes or holes at the ends of the semi-cylindrical parts "*a*", said points "*d*", are mounted in a semi-vertical relation to the circle, and have a stop so as not to allow them to close the mouth or opening of said trap entirely, but free to the pivotal motion to open the mouth of said trap wide open. Said points "*d*", are supported by springs "*g*".

The semi-circular part or arch "*e*", which connects the points "*d*", also tends to strengthen the ends of said semi-cylindrical parts "*a*". The semi-cylindrical parts "*a*", to form a cylinder are pivotally connected along one side by a hinge-pin "*b*". On pin "*b*", is mounted a bait-holder "*f*". To provide against accidental opening of the trap, a lock-pin "*c*", is inserted through the eyes or holes of the semi-cylindrical parts "*a*", at the opposite side of the trap from the hinge-pin "*b*". The lock-pin "*c*", is secured to one of the semi-cylindrical parts "*a*", by means of a chain "*i*", which has ring "*j*", for fastening the trip, if desired.

Explanation: It will be seen that the mouth of the trap is partially open, and when the game enters the trap from either end, the points "*d*", which are pivotally connected to said trap, as best shown in Fig. 2, will by the slightest pressure spread the points, thus making it easy for the game to enter said opening, and at the opposite end the points will not open, as the pressure of the game from the inside of the trap will hold them firmly in the position as shown in Fig. 4. If the game attempts to back out the springs "*g*", will actuate said points "*d*", pressing the ends gently against the game and the harder the game pulls backward the tighter the points will grip, until they come to the limited close of the mouth or opening. To remove the game from said trap, pull out the lock-pin "*c*". and the trap will be free to the action of the hinged device, as shown in Fig. 3. The two semi-cylindrical parts or shell sections are stamped or formed each from a single piece of sheet metal and they are bent to form the hinge lugs for hinge pin *b* and the perforated eyes or lugs for the curved pivot rods *e*. This is not only cheap construction, but it gives both a smooth interior and exterior surface to the cylindrical body or casing. The improved trap may, therefore, be easily inserted into a burrowed hole for the purpose of catching the animal.

Having thus fully described my invention, what I claim as new, and desire to secure by Letters Patent is—

A trap having a cylindrical body made up of two pressed sheet metal semi-cylindrical sections and having integral hinge lugs at one edge and integral perforated lugs at both ends, combined with a hinge pin connecting the said hinge lugs, approximately semi-circular pivot rods passed through the end lugs of said sections and inwardly spring pressed barbs pivotally connected to said end lugs by said pivot rods, the said semi-cylindrical sections having means for detachably connecting their normally free edges and openings through which a trapped animal may be shot.

In testimony whereof I hereunto affix my signature in presence of two witnesses.

JOHN SEVERIN ANDERSON.

Witnesses:
ANDREW DRENGSON,
C. S. OLSON.

Copies of this patent may be obtained for five cents each, by addressing the "Commissioner of Patents, Washington, D. C."